(12) United States Patent
Yang

(10) Patent No.: US 10,126,545 B2
(45) Date of Patent: Nov. 13, 2018

(54) COLOR WHEEL ASSEMBLY AND RELATED LIGHT SOURCE SYSTEM THEREOF

(71) Applicant: APPOTRONICS CORPORATION LIMITED, Shenzhen (CN)

(72) Inventor: Yihong Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 33 days.

(21) Appl. No.: 14/895,471

(22) PCT Filed: Jun. 7, 2014

(86) PCT No.: PCT/CN2014/079426
§ 371 (c)(1),
(2) Date: Dec. 2, 2015

(87) PCT Pub. No.: WO2014/194863
PCT Pub. Date: Dec. 11, 2014

(65) Prior Publication Data
US 2016/0124213 A1    May 5, 2016

(30) Foreign Application Priority Data
Jun. 7, 2013 (CN) .................... 2013 2 0328551 U

(51) Int. Cl.
*G02B 26/00* (2006.01)
*G03B 21/14* (2006.01)
(Continued)

(52) U.S. Cl.
CPC .............. *G02B 26/008* (2013.01); *F21V 9/30* (2018.02); *G02B 7/00* (2013.01); *G02B 7/006* (2013.01);
(Continued)

(58) Field of Classification Search
CPC ........ G02B 26/008; G02B 7/008; G02B 7/00; G02B 7/006; G03B 21/206; G03B 21/14; G03B 33/08; F21V 9/16
See application file for complete search history.

(56) References Cited

U.S. PATENT DOCUMENTS

| | | | |
|---|---|---|---|
| 7,367,678 B2 | 5/2008 | Kobayashi | |
| 2002/0003704 A1* | 1/2002 | Ohmae ................ | F21S 10/007 362/293 |

(Continued)

FOREIGN PATENT DOCUMENTS

| | | |
|---|---|---|
| CN | 101369090 A | 2/2009 |
| CN | 101387724 A | 3/2009 |

(Continued)

OTHER PUBLICATIONS

International Search Report in the parent PCT application No. PCT/CN2014/079426, dated Jul. 28, 2014.

(Continued)

*Primary Examiner* — David V Bruce
(74) *Attorney, Agent, or Firm* — Chen Yoshimura LLP

(57) ABSTRACT

A color wheel assembly includes a color wheel fixed in a housing and a detecting apparatus for generating a synchronization signal. The color wheel is driven to rotate and has a marking object rotating with it. The housing has a first surface parallel to and adjacent a surface of the color wheel where the marking object is located. The first surface of the housing has a first through hole at a location within an annular region corresponding to the marking object when the color wheel rotates by one revolution. The detecting apparatus is disposed on the back side of the first through hole and a probe head of the detecting apparatus is disposed in the first through hole for detecting the marking object on the color wheel. The structure insulates the probe head from (Continued)

heat emitted from the color wheel. A related light source system is also disclosed.

15 Claims, 2 Drawing Sheets

(51) Int. Cl.
G03B 33/08 (2006.01)
G02B 7/00 (2006.01)
G03B 21/20 (2006.01)
F21V 9/30 (2018.01)

(52) U.S. Cl.
CPC ............ *G02B 7/008* (2013.01); *G03B 21/14* (2013.01); *G03B 21/206* (2013.01); *G03B 33/08* (2013.01)

(56) References Cited

U.S. PATENT DOCUMENTS

| 2004/0095767 | A1 | 5/2004 | Ohmae et al. |
| 2005/0225731 | A1 | 10/2005 | Kobayashi |
| 2006/0215128 | A1* | 9/2006 | Iwanaga ............... H04N 9/3182 353/84 |
| 2007/0139618 | A1 | 6/2007 | Decusatis et al. |
| 2009/0073592 | A1* | 3/2009 | Huang ................ G02B 26/008 359/892 |
| 2009/0080057 | A1 | 3/2009 | Huang |
| 2010/0102659 | A1 | 4/2010 | Suzuki et al. |

FOREIGN PATENT DOCUMENTS

| CN | 102426403 A | 4/2012 |
| CN | 102853377 A | 1/2013 |
| CN | 203311071 U | 11/2013 |
| JP | 2000-47601 A | 2/2000 |
| JP | 2001-337390 A | 12/2001 |
| JP | 2002-058225 A | 2/2002 |
| JP | 2006-267926 A | 10/2006 |
| JP | 2010-102176 A | 5/2010 |
| JP | 2012-150349 A | 8/2012 |

OTHER PUBLICATIONS

IPRP in the parent PCT application No. PCT/CN2014/079426, dated Dec. 8, 2015.
Japanese Office Action, dated Aug. 31, 2016 in a counterpart Japanese patent application, No. JP 2016-517153.
Korean Office Action, in a counterpart application KR 10-2015-7036291, dated Dec. 6, 2016.
Supplementary European Search Report in corresponding application EP 14808181.3, dated May 12, 2016.

* cited by examiner

COLOR WHEEL ASSEMBLY AND RELATED LIGHT SOURCE SYSTEM THEREOF

BACKGROUND OF THE INVENTION

Field of the Invention

This invention relates to illumination and display technologies, and in particular, it relates to a color wheel assembly and related light source system.

Description of Related Art

Projection systems are widely used in cinemas, meetings and other display applications. In a projection system, the color wheel and the light modulating device are required to be synchronized. In some conventional synchronization technologies, a piece of black light absorbing tape is adhered on the drive motor of the color wheel, and a detecting apparatus is provided. When the color wheel rotates, the probe head of the detecting apparatus emits a signal toward the motor, which is reflected by the motor and received by the probe head. When the light absorbing tape rotates to a position corresponding to the probe head, the signal emitted by the probe head is absorbed by the tape. Thus, the probe head does not detect the signal, which can be used to determine the rotation position of the motor and to generate a synchronization signal.

However, the performance of a typical detecting apparatus is impacted by temperature, and its accuracy is significantly reduced in a high temperature operating environment.

SUMMARY

Embodiments of the present invention provide a color wheel assembly in which the impact of the heat generated by the color wheel on the detecting apparatus is reduced.

An embodiment of the present invention provides a color wheel assembly, which includes:

A color wheel, including a driving apparatus with a rotating shaft and an optical assembly fixed on the rotating shaft, the driving apparatus drives the optical assembly to rotate, wherein the color wheel includes a marking object which rotates with the rotating shaft;

A housing, where the color wheel is mounted inside the housing, the housing includes a first surface, which is parallel to and adjacent to a plane where the marking object on the color wheel is located. A first through hole is provided on the first surface within an annular region corresponding to the marking object when the color wheel rotates by one revolution;

A detecting apparatus having a probe head, disposed at one side of the first through hole that faces away from the color wheel, wherein the probe head is disposed in the first through hole and is used for detecting the marking object on the color wheel.

Preferably, the housing includes a light transmitting plate covering the first through hole, wherein the probe head is disposed on a side of the light transmitting plate that faces away from the color wheel.

Preferably, the light transmitting plate is connected to the first surface by an air-tight seal.

Preferably, the first through hole has a step feature on its inner surface, wherein the light transmitting plate is adhered to the step feature to be fixed in the first through hole.

Preferably, the detecting apparatus further includes a sensor circuit board, located on a side of the probe head that faces away from the light transmitting plate;

Wherein the color wheel assembly further includes a washer, disposed between the light transmitting plate and the sensor circuit board, for sealing the probe head between the light transmitting plate and the sensor circuit board.

Preferably, the housing seals the color wheel inside the housing.

Preferably, the optical assembly includes a substrate carrying wavelength conversion materials, wherein the marking object is disposed on the substrate in an area outside of a light transmission area; or, the optical assembly includes a filter plate, wherein the marking object is disposed on the filter plate in an area outside of a light transmission area.

Preferably, the optical assembly includes a substrate carrying wavelength conversion materials, the substrate being coated with a reflective layer, and the marking object is a through hole.

Preferably, the marking object is disposed on the rotating shaft.

Another embodiment of the present invention provides a light source system which includes the above color wheel assembly.

Compared with conventional technologies, the embodiments of the present invention have the following advantages:

In the present embodiments, because the first surface of the housing is located between the detecting apparatus and the color wheel to separate them, and the first surface has only a through hole at a location corresponding to the marking object, the head transmitted from the color wheel to the detecting apparatus is reduced, which is beneficial to the stable working condition of the detecting apparatus.

DETAILED DESCRIPTION OF PREFERRED EMBODIMENTS

Embodiments of the present invention are described below with reference to the drawings.

First Embodiment

Figure 1:
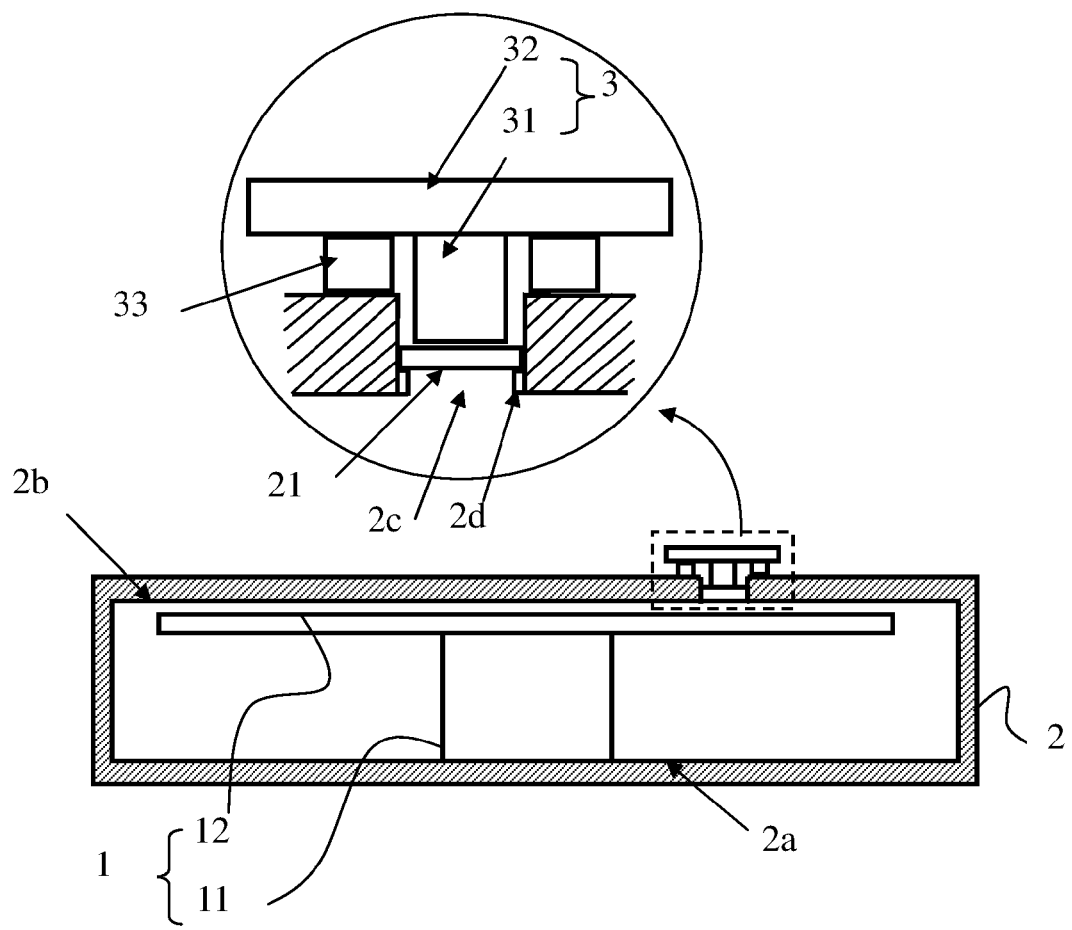
FIG. 1 schematically illustrates the structure of a color wheel assembly according to an embodiment of the present invention.
Figure 2:
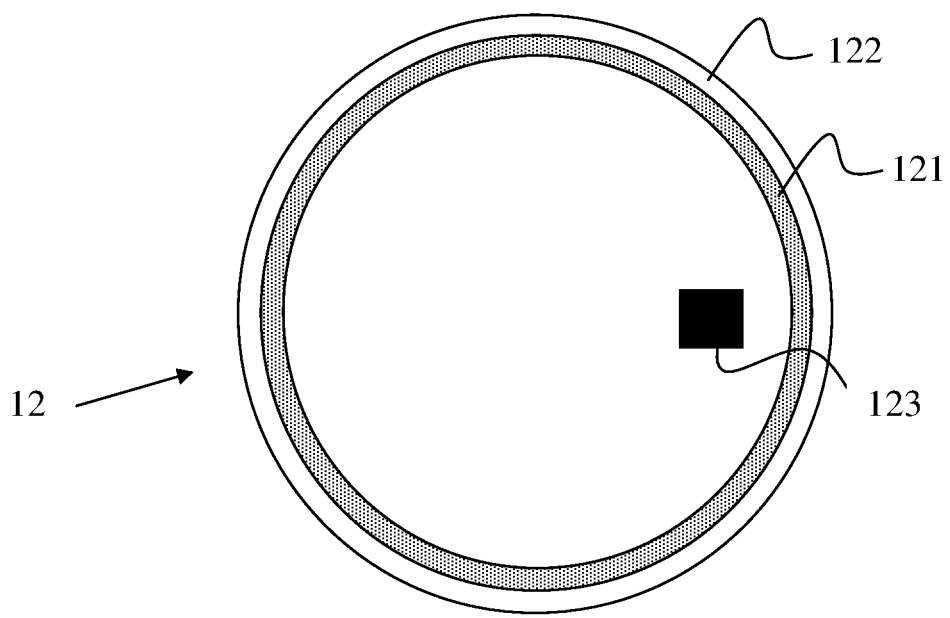
FIG. 2 is a plan view of the optical assembly of the color wheel assembly of FIG. 1.

Refer to FIG. 1 and FIG. 2, where FIG. 1 schematically illustrates the structure of a color wheel assembly according to an embodiment of the present invention, and FIG. 2 is a plan view of the optical assembly of the color wheel assembly of FIG. 1. The color wheel assembly includes a color wheel 1, a housing 2 and a detecting apparatus 3.

The color wheel 1 includes a driving apparatus 11 having a rotating shaft, and an optical assembly 12 fixed on the rotating shaft of the driving apparatus 11. The driving apparatus 11 drives the optical assembly 12 to rotate. In one specific example, the optical assembly 12 includes a wavelength conversion layer 121 and a substrate 122 for carrying the wavelength conversion layer 121. The substrate 122 has a round plate shape; the wavelength conversion layer 121 is disposed on the substrate 122 and forms a concentric ring with the round plate, for absorbing an excitation light to generate a converted light. The driving apparatus 11 is a cylindrical shaped motor, and the driving apparatus 11 is coaxially fixed with the wavelength conversion layer 121 and the substrate 122. The color wheel 1 is a reflective type device, i.e., the propagation paths of the excitation light and the converted light are located on the same side of the wavelength conversion layer 121. Correspondingly, the substrate 122 is a metal plate coated with a high reflective layer, such as a silver coating layer or an aluminum coating layer. They rely on reflection of the incident light by the high reflective layer to achieve a reflective type color wheel.

The color wheel 1 is mounted inside the housing 2. In this embodiment, the housing 2 has a cylindrical shape. Because the color wheel 1 generates a large amount of heat during operation, the housing 2 is preferably made of a temperature resistant material. The driving apparatus 11 of the color wheel 1 is mounted on an end surface 2a of the housing 2, to mount the color wheel 1 in the housing 2. Of course, in practice, other methods may be used to mount the color wheel 1 in the housing 2. The other end surface of the housing 2, referred to as the first surface 2b, is parallel to and adjacent to the substrate 122, and the side of the substrate 122 that carries the wavelength conversion layer 121 faces toward the first surface 2b.

On the side of the substrate 122 that faces toward the first surface 2b, in an area outside the area occupied by the wavelength conversion layer 121, a marking object 123 is provided, which avoids the optical path of the light. In practice, the side of the substrate 122 that carries the wavelength conversion layer 121 may alternatively face away from the first surface 2b. Because no light will pass through the side of the substrate 122 that faces toward the first surface 2b, the marking object 123 disposed on the side of the substrate 122 that faces toward the first surface 2b can be located anywhere on that side other than the center of the circle, so that the marking object 123 rotates together with the substrate 122.

A first through hole 2c is provided on the first surface 2b of the housing 2, at a location within an annular region corresponding to the marking object 123 when the color wheel 1 rotates by one revolution. The housing 2 further includes a light transmitting plate 21, which covers the first through hole 2c. The light transmitting plate 21 may be glass or other material that permits the sensor signal emitted by the detecting apparatus to transmit through it. Preferably, at least one side of the light transmitting plate 21 is coated with an antireflection coating, for better transmitting the sensor signal (such as infrared signal). In this embodiment, the inner surface of the first through hole 2c is provided with a step feature 2d around the through hole 2c, and the light transmitting plate 21 is adhered to the step feature 2d so as to be affixed in the first through hole 2c. In practice, the light transmitting plate 21 may also be directly adhered to the first through hole 2c or affixed to the first through hole 2c by other suitable means. Preferably, the connection between the light transmitting plate 21 and the first surface 2b is an air-tight seal, to further prevent the heat generated by the color wheel from being transmitted to the detecting apparatus.

In this embodiment, the housing 2 can alternatively have other shapes, so long as the housing 2 includes one side that is parallel to and adjacent to the plane where the marking object 123 is located. The housing 2 is further provided with a light entrance port and a light exit port (not shown in the drawings), so that the excitation light is incident through the light entrance port onto the color wheel 1 within the housing 2 to excite the wavelength conversion layer 121, and the converted generated by the wavelength conversion layer is output through the light exit port of the housing 2. Preferably, the light entrance port and the light exit port of the housing 2 are sealed with light transmitting plates, so as to seal the color wheel 1 inside the housing 2, which can further achieve dust prevention and noise insulation. In this embodiment, because the color wheel 1 is a reflection type, i.e., the propagation paths of the excitation light and the converted light are located on the same side of the wavelength conversion layer 121, the light entrance port and the light exit port of the housing 2 are the same port.

The detecting apparatus 3 includes a probe head 31. The detecting apparatus 3 is disposed on a side of the first surface 2b of the housing 2 that faces away from the color wheel 1, where the probe head 31 is disposed adjacent the light transmitting plate 21, so that it can detect the marking object 123 once in every revolution of the color wheel 1. It is noted that, to ensure detection accuracy of the probe head 31, the distance between the probe head 31 and the marking object should be very small; the specific distance is determined by the probe head 31, but it is typically about 3 mm. Therefore, the distance between the first surface 2b and the substrate 122 is less that the predetermined distance between the probe head 31 and the marking object. To allow the detecting apparatus 3 to be closer to the marking object 123, the light transmitting plate 21 is preferably disposed in the first through hole 2c or near an end of the first through hole 2c that faces toward the color wheel 1, so that the probe head 31 and the marking object 123 can be closer to each other.

In this embodiment, when the detecting apparatus 3 operates, the probe head 31 emits an optical signal, which passes through the light transmitting plate 21 to incident on the substrate 122 of the color wheel 1. When the color wheel is not rotated to a location where the marking object 123 and the light transmitting plate 21 are aligned, the optical signal is reflected by the substrate 122 and passed through the light transmitting plate 21 again, and is received by the probe head 31. When the color wheel 1 is rotated to the location where the marking object 123 and the light transmitting plate 21 are aligned, the optical signal emitted by the probe head 31 is absorbed by the marking object 123 so it cannot be reflected back to the probe head 31. As a result, the probe head 31 can sense the rotation position of the color wheel 1. A typically used detecting apparatus and marking object 123 are respectively an infrared sensor and a black light absorbing tape which is adhered to the substrate 122. Of course, these are only examples and are not limiting.

Of course, in practice, the marking object 123 can be other objects that do not reflect the optical signal back to the probe head 31. For example, the marking object 123 can be a through hole on the substrate 122; when the color wheel 1 is rotated to a position where the through hole is aligned with the light transmitting plate 21, the optical signal emitted by the probe head 31 passes through the through hole and cannot be reflected back to the probe head 31. The black light absorbing tape may fall off the color wheel 1 in high temperature conditions, while using the through hole can avoid this problem. However, the through hole may disturb the dynamic balance of the rotation of the color wheel 1. Thus, another through hole may be provided on the substrate 122 on same diameter as the marking object 123, at a location that cannot be detected by the probe head 31 and is outside of the area of the wavelength conversion layer 121, to maintain the dynamic balance of the rotation of the color wheel 1. Of course, in situations where the dynamic balance requirement of the color wheel 1 is not very high, the second through hole is not provided to maintain the dynamic balance of the color wheel 1.

In this embodiment, because the detecting apparatus and the color wheel are separated by the housing and the light transmitting plate, the high temperature in the vicinity of the color wheel cannot be conducted to the detecting apparatus, which ensures the stable operation of the detecting apparatus.

Of course, in this embodiment, the first through hole 2c does not have to be covered by the light transmitting plate, and the probe head 31 can be directly mounted on the side of the first surface 2b that faces away from the color wheel 1 at the location of the first through hole 2c. This way, the first surface 2b can already block a majority of the heat generated by the color wheel 1, and the heat received by the detecting apparatus from the color wheel 1 is reduced as compared to conventional technologies.

In this embodiment, the marking object 123 does not have to be located on the side of the 122 that faces away from the driving apparatus 11, but can be located on the side of the substrate 122 that contacts the driving apparatus 11. Because the distance between the marking object 123 and the probe head 31 needs to meet a certain requirement, the shape of the housing 2 needs to be changed accordingly, such that a surface of the housing 2 is parallel to and adjacent the area where the marking object 123 is located, and such that the distance between that surface and the area where the marking object 123 is located is no greater than the predetermined distance between the probe head 31 and the marking object 123.

In this embodiment, the color wheel 1 may alternatively be a transmission type, i.e., the propagation paths of the excitation light and converted light of the color wheel 1 are located on two different sides of the substrate 122. Correspondingly, the substrate 122 transmits the light beam. The marking object 123 is located at a location that avoids the optical path of the excitation light and the converted light. Because the substrate 122 transmits the optical signal, the marking object 123 is an element that reflects the optical signal, such as a small reflecting mirror. However, because a small reflecting mirror is relatively heavy, another object is added to the substrate 122 to maintain the dynamic balance of the color wheel 1. The marking object 123 may alternatively be realized by providing a reflective coating on the substrate 122 at a location that corresponds to the light transmitting plate 21.

In this embodiment, the optical assembly may alternatively be a filter plate, and the marking object 123 is located on the filter plate at a location other than where the light beam passes. By the same principle, if the filter plate transmits the optical signal, the marking object 123 is a reflective coating on the filter plate at a location that corresponds to the light transmitting plate 21; if the filter plate reflects the optical signal, the marking object 123 is an element that absorbs the optical signal or a through hole.

In this embodiment, the color wheel assembly may further includes a washer 33, disposed on a side of the first through hole 2c that cases away from the color wheel 1. The detecting apparatus further includes sensor circuit board 32, disposed on the washer 33, for sealing the probe head 31 between sensor circuit board 32 and the light transmitting plate 21. This can prevent dust from falling on the surface of the probe head 31 which could reduce the accuracy of the probe head 31.

Second Embodiment

Figure 3:
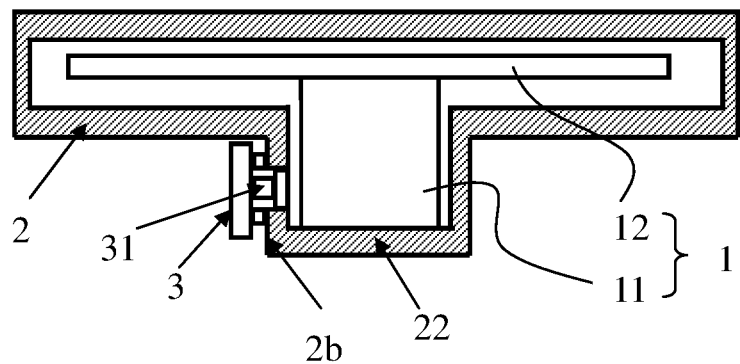
FIG. 3 schematically illustrates the structure of a color wheel assembly according to another embodiment of the present invention.

Refer to FIG. 3, which schematically illustrates the structure of a color wheel assembly according to another embodiment of the present invention. The color wheel assembly includes a color wheel 1, a housing 2 and a detecting apparatus 3.

Differences between this embodiment and the first embodiment include:

In this embodiment, the marking object (not shown in the drawing) as the object being sensed by the detecting apparatus 3 is not disposed on the optical assembly or the substrate, but is disposed on the rotating shaft of the driving apparatus 11. Correspondingly, to ensure that the distance between the probe head 31 of the detecting apparatus 3 and the marking object is within the predetermined distance, the housing 2 includes a cylindrical shaped cavity 22. When the color wheel 1 is mounted in the housing 2, the rotating shaft of the color wheel 1 is located the cylindrical shaped cavity, and is coaxial with the cavity, so that the surface of the cavity is parallel to and adjacent the surface of the rotating shaft, where the inner surface of the cavity is the first surface 2b.

Because the marking object is located on the rotating shaft, and the diameter of the rotating shaft is much greater than the thickness of the optical assembly or the substrate, it is not suitable to provide the marking object as a through hole. On the other hand, the surface of the rotating shaft is typically a shiny metal surface and can reflect the optical signals emitted by the probe head 31 back to the probe head 31, the marking object in this embodiment is an element that can absorb the optical signal.

The various embodiments in this disclosure are described in a progressive manner, where each embodiment is described by emphasizing its differences from other embodiments. The common or similar features of the embodiments can be understood by referring to each other.

Another embodiment of the present invention provides a light source system, including a color wheel assembly which may have the structures and functions as described in the above embodiments.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A color wheel assembly, comprising:
   a color wheel, including a driving apparatus with a rotating shaft and an optical assembly fixed on the rotating shaft, the driving apparatus drives the optical assembly to rotate, the color wheel further including a marking object which rotates with the rotating shaft;
   a housing, wherein the color wheel is mounted inside the housing, the housing includes a first surface, which is parallel to and adjacent a plane where the marking object on the color wheel is located, and wherein a first through hole is provided on the first surface within an annular region corresponding to the marking object when the color wheel rotates by one revolution; and
   a detecting apparatus having a probe head, disposed at one side of the first through hole that faces away from the color wheel, wherein the probe head is disposed in the first through hole, for detecting the marking object on the color wheel, wherein the housing includes a light transmitting plate covering the first through hole, wherein the probe head is disposed on a side of the light transmitting plate that faces away from the color wheel.

2. The color wheel assembly of claim 1, wherein the light transmitting plate is connected to the first surface by an air-tight seal.

3. The color wheel assembly of claim 1, wherein the first through hole has a step feature on its inner surface, and wherein the light transmitting plate is adhered to the step feature to be fixed in the first through hole.

4. The color wheel assembly of claim 1, wherein the detecting apparatus further includes a sensor circuit board, located on a side of the probe head that faces away from the light transmitting plate; and wherein the color wheel assembly further includes a washer, disposed between the light transmitting plate and the sensor circuit board, for sealing the probe head between the light transmitting plate and the sensor circuit board.

5. The color wheel assembly of claim 1, wherein the housing seals the color wheel inside the housing.

6. A light source system, comprising the color wheel assembly of claim 1.

7. A color wheel assembly, comprising:

a color wheel, including a driving apparatus with a rotating shaft and an optical assembly fixed on the rotating shaft, the driving apparatus drives the optical assembly to rotate, the color wheel further including a marking object which rotates with the rotating shaft;

a housing, wherein the color wheel is mounted inside the housing, the housing includes a first surface, which is parallel to and adjacent a plane where the marking object on the color wheel is located, and wherein a first through hole is provided on the first surface within an annular region corresponding to the marking object when the color wheel rotates by one revolution; and a detecting apparatus having a probe head, disposed at one side of the first through hole that faces away from the color wheel, wherein the probe head is disposed in the first through hole, for detecting the marking object on the color wheel, wherein the optical assembly includes a substrate carrying wavelength conversion materials, wherein the marking object is disposed on the substrate in an area outside of a light transmission area; or, the optical assembly includes a filter plate, wherein the marking object is disposed on the filter plate in an area outside of a light transmission area.

8. The color wheel assembly of claim 7, wherein the optical assembly includes a substrate carrying wavelength conversion materials, the substrate being coated with a reflective layer, and the marking object is a through hole.

9. A color wheel assembly, comprising:

a color wheel, including a driving apparatus with a rotating shaft and an optical assembly fixed on the rotating shaft, the driving apparatus drives the optical assembly to rotate, the color wheel further including a marking object which rotates with the rotating shaft;

a housing, wherein the color wheel is mounted inside the housing, the housing includes a first surface, which is parallel to and adjacent a plane where the marking object on the color wheel is located, and wherein a first through hole is provided on the first surface within an annular region corresponding to the marking object when the color wheel rotates by one revolution; and a detecting apparatus having a probe head, disposed at one side of the first through hole that faces away from the color wheel, wherein the probe head is disposed in the first through hole, for detecting the marking object on the color wheel, wherein the marking object is disposed on the rotating shaft.

10. The color wheel assembly of claim 9, wherein the housing includes a light transmitting plate covering the first through hole, wherein the probe head is disposed on a side of the light transmitting plate that faces away from the shaft.

11. The color wheel assembly of claim 10, wherein the light transmitting plate is connected to the first surface by an air-tight seal.

12. The color wheel assembly of claim 10, wherein the first through hole has a step feature on its inner surface, and wherein the light transmitting plate is adhered to the step feature to be fixed in the first through hole.

13. The color wheel assembly of claim 10, wherein the detecting apparatus further includes a sensor circuit board, located on a side of the probe head that faces away from the light transmitting plate; and wherein the color wheel assembly further includes a washer, disposed between the light transmitting plate and the sensor circuit board, for sealing the probe head between the light transmitting plate and the sensor circuit board.

14. The color wheel assembly of claim 10, wherein the housing seals the color wheel inside the housing.

15. The color wheel assembly of claim 9, wherein the housing includes a cylindrical shaped cavity, an inner surface of the cavity being the first surface, and wherein the rotating shaft is located in and coaxial with the cylindrical shaped cavity.

* * * * *